United States Patent [19]

Mosley et al.

[11] Patent Number: 5,204,007

[45] Date of Patent: Apr. 20, 1993

[54] METHOD OF CLARIFICATION OF WASTE WATER FOR PRODUCTION OF ANIMAL FEEDS

[75] Inventors: Kenneth L. Mosley, 100 Roundabout Dr., Trussville, Ala. 35173; Hans E. Lundgren, 7939 Titian Way, Salt Lake City, Utah 84121

[73] Assignees: Kenneth L. Mosley, Trussville, Ala.; Hans E. Lundgren, Salt Lake City, Utah

[21] Appl. No.: 814,574

[22] Filed: Dec. 30, 1991

Related U.S. Application Data

[63] Continuation-in-part of Ser. No. 753,827, Sep. 3, 1991, abandoned.

[51] Int. Cl.$^5$ .............................................. C02F 1/24
[52] U.S. Cl. ................................... 210/705; 210/710; 210/725; 210/727; 210/905; 426/635; 426/657
[58] Field of Search ............... 210/666, 705, 710, 725, 210/727, 728, 734, 905; 426/623, 630, 635, 656, 657

[56] References Cited

U.S. PATENT DOCUMENTS

| | | | |
|---|---|---|---|
| 2,261,924 | 11/1941 | Pittman et al. | 210/737 |
| 3,128,249 | 4/1964 | Pye et al. | 210/727 |
| 4,013,555 | 3/1977 | Davis | 210/725 |
| 4,282,256 | 8/1981 | Evich et al. | 210/710 |
| 4,790,943 | 12/1988 | Dunn et al. | 210/705 |

FOREIGN PATENT DOCUMENTS

| | | | |
|---|---|---|---|
| 759955 | 5/1971 | Belgium | 210/905 |
| 49-34159 | 3/1974 | Japan | 210/905 |
| 50-33142 | 10/1975 | Japan | 210/905 |

*Primary Examiner*—Peter Hruskoci
*Attorney, Agent, or Firm*—Jennings, Carter, Thompson & Veal

[57] ABSTRACT

Method for removing suspended solids from a stream of waste water for subsequent use as an animal feed, wherein bentonite and an anionic polymer are added to the waste water which is maintained within a predetermined pH range. No metallic salts or other materials unacceptable as food additives are added to the waste water stream to facilitate flocculation of the bentonite and suspended solids. The pH range, maintained from 3.5 to 9.0 and optimally from 4.0 to 5.0, facilitates the coagulation of the suspended solids without the use of the metallic salts or other such additives. Microscopic air bubbles are used to float the flocculated bentonite and solids to the surface. In some cases the materials may be floated by gravity forces alone without the use of air bubbles. These floated materials are removed by skimmers or other top-floating solids removing apparatus commonly known in the industry and rendered into animal feed products.

4 Claims, 1 Drawing Sheet

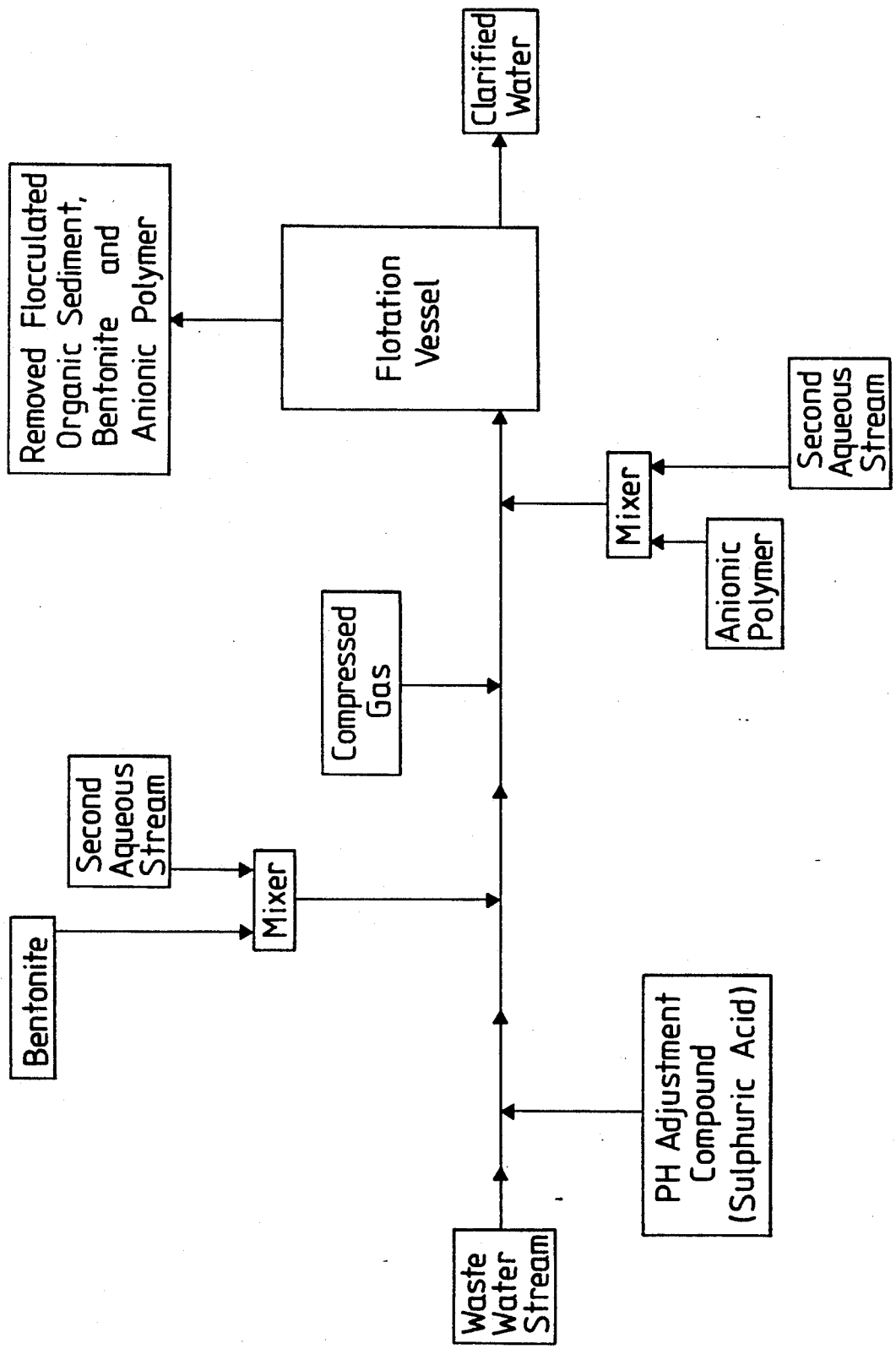

METHOD OF CLARIFICATION OF WASTE WATER FOR PRODUCTION OF ANIMAL FEEDS

This is a continuation-in-part of application Ser. No. 07/753,827, filed Sep. 3, 1991 now abandoned.

FIELD OF THE INVENTION

This invention relates to the field of solids removal from waste water streams. More specifically, it relates to the field of efficiently floating such solids to the surface of a partially confined waste water stream. In even greater particularity the invention relates to the recovery of such solids for use as animal foodstuff.

BACKGROUND OF THE INVENTION

Present methods for suspended solids removal include filtration, sedimentation and flotation. The method closest to the present invention is gas flotation wherein the waste water stream is conditioned with a coagulant or coagulants, and a polyelectrolyte polymer, then injected with a gas such as air and retained for a period of time in a vessel. Retention allows a blanket of solids to form on top of the retained waste water. The blanket is skimmed off and further processed. This method and the vessel with its skimmers, piping, and controls are well known to those skilled in the art as are the coagulants and polymers used. It is known to add metal salts, organic coagulants, or bentonite and a polymer in certain combinations and quantities to a waste water stream wherein the gas flotation method is used to clarify the waste water stream. Such known methods, typically, result in formation of a blanket of solids and water to be removed which contains about 5 to 25% solids.

The removed solids include, of course, those contained in the waste water stream, as well as, those added to induce the solids to float and form a blanket. Since the blanket from a waste water stream resulting from food processing must be disposed of or further processed, it is more economical and more environmentally acceptable to render the blanket (wherein the produce is cooked and water removed) and return the solids to the animal food chain as an ingredient in cattle, chicken or other animal foods. The known prior art methods add oxidizing chemicals and/or other solids to the waste which can reduce the value of the recovered solids.

Prior art methods employing gas flotation are capable of floating particles from a colloidal suspension by destabilizing the electrical charge of the particles, by the use of a coagulant and by adding a polymer with an opposite charge. Thus, the compounds added are either anionic, cationic or nonionic. The result, electrically, of the additions should be to have particles of such a charge that the gas bubbles will be attached to the solids and float the agglomerates to the surface. Other problems in the prior art led to the present invention, to wit: metal salts used as coagulants are not desirable in material to be returned to the animal food chain and metal salts are also undesirable because of their tendency to coat the cooker, thereby reducing efficiency and creating a constant need for cleaning which is time-consuming and costly. Also, where bentonite is used as a coagulant, a cationic polymer is commonly needed to cause flocculation for acceptable flotation. Cationic polymers have been found to have toxic qualities and thus are not appropriate as an additive for animal feed.

Many anionic polymers are typically safe for animal consumption. Several patents are cited herebelow that disclose the use of an anionic polymer with bentonite to promote the flocculation of solids in waste water. Japanese Patents Nos. 53-45051 and 53-93655 issued to Toshin suggest that an anionic or cationic polymer may be used with bentonite as a coagulant. Japanese Patent No. 54-16845 issued to Ebara also discloses the use of either an anionic or nonionic polymer with bentonite to clarify waste water. U.S. Pat. No. 3,128,249 and Australian Patent No. 215,787, both issued to Pye, disclose a method for clarifying waste water wherein an acrylamide polymer is mixed with bentonite to flocculate suspended solids.

It should be noted that the above-mentioned prior art does not contemplate using the recovered solids as animal feed. Thus, the prior art does not contemplate the use of selected coagulants specifically for their characteristic as a safe, non-toxic food additive nor does the prior art contemplate maximizing the concentration of recovered solids to facilitate a profitable processing of these solids into animal feed. Reducing the turbidity of the waste water to an acceptable level is the primary goal of the prior art. It has been the experience of the applicants and the industry that using an anionic polymer with bentonite to clarify waste water will reduce the turbidity of the water; however, the recovery of waste solids in relation to the amount of introduced coagulant has proven to be adequate at best. The prior art, though acceptable in the industry for which it was developed, may not provide sufficient or consistently reliable recoveries of solids to sustain an economically viable processing of the recovered solids into animal feed. As will be shown hereafter, the waste water clarification methods set forth in the prior art have been improved by the present invention to maximize the recovery of solids from waste water.

SUMMARY OF THE INVENTION

In an effort to provide an improved method of solids removal from a waste water stream wherein the solids could be returned to the animal food chain, we tried to use material known to be acceptable as a food additive such as bentonite. However, the known methods and materials either did not provide sufficient levels of solids recovery or caused the removed solids to be unacceptable as food additives. It was decided that since certain products, such as, ammonium lignosulphonate and some alginates worked better at a low pH in the waste water stream that such a low pH might also enhance the bentonite and that since a cationic polymer would probably cause the resulting material to be unacceptable that an anionic polymer would be sought. We found that lowering the stream pH to a range of 3.5 to 9.0 cause the bentonite to perform extremely well with an anionic polymer. The reason for the anionic polymer performing so well when combined with the low pH and bentonite is not understood by the inventors. The results, however, were gratifying since less polymer is required and no increase in bentonite is required and the resulting solids blanket is about 5 to 25% solids and readily renderable into a material that is acceptable when returned to the animal food chain.

BRIEF DESCRIPTION OF THE DRAWING

The drawing shows a diagram of the preferred embodiment of the invention.

DESCRIPTION OF THE PREFERRED EMBODIMENT

In the preferred embodiment of the invention as shown in the drawing sodium or calcium bentonite is used. The waste water stream is typically that of a food processing plant and is fed through a waste conditioning system wherein the pH is adjusted to 3.5 to 9.0, bentonite and a polymer are added and transferred into an air flotation device or any other device that floats material, such devices being well known to those skilled in the art. A bentonite-water mix is prepared in the form of a slurry containing 6% bentonite (a range of 1% to 10% is found acceptable for most waste water streams). The slurry is metered into the waste water stream at a rate of 200 to 600 (100 to 1000 is acceptable) milligrams of dry bentonite per liter of waste water. A polymer-water solution is prepared using an anionic polymer. The solution contains 0.01 to 5.0% polymer by weight and is added to the waste water stream at a rate of 1 to 2 (0.05 to 10 is acceptable) milligrams of equivalent dry polymer per liter of waste water or 3 to 6 milligrams of a liquid polymer (1.5 to 30 is acceptable). A float blanket containing solids and water forms readily and is mechanically removed and transported to a rendering plant as is or following dewatering. The blanket typically contains 5 to 25% solids. This process is equally effective on waste water streams originating from non food processing operations.

EXAMPLE

A sodium type bentonite from a deposit near Belle Fourche, S. Dak., was dispersed in water to prepare a slurry containing 6% bentonite by weight. The slurry was employed for the clarification of food processing waste water. This particular waste water was from a chicken processing plan in Marietta, Georgia. To prepare the bentonite for use, the dry material was educted into a stream of water in proportional amounts that would result in a 6% slurry. This slurry was then exposed to a mixing chamber for about 1 to 2 minutes. The mixer velocity is approximately 3600 rpm. The resulting activated slurry was then metered into the food processing waste water stream that had been pH corrected to a pH of 3.5 to 9.0. Approximately 400 to 600 ppm of the bentonite was added. After 15 second following the bentonite addition, a dose of approximately 1 to 2 ppm of an anionic polyelectrolyte polymer was added. Thereafter, the treated water was transferred to a vessel equipped with top skimmers to remove the resulting float blanket. The effluent (treated waste water) was discharged to a municipal sewer.

Successive determination under the above conditions produced the following results.

|  | Raw Waste Water | Treated Waste Water |
|---|---|---|
| TSS | 1000 ppm | 100 ppm |
| OG | 1200 ppm | 15 ppm |
| BOD | 2500 ppm | 180 ppm |

| Float Characteristics | | |
|---|---|---|
|  | Ferric Sulphate Coagulant | Bentonite Coagulant |
| Moisture | 81% | 82% |
| Free Fatty Acid | 40% | 4% |
| Iron | 4130 mg/kg | 15 ppm |
| Peroxide | 48.1 meq/kg | 4.21 meq/kg |

From the foregoing it may be seen that our flotation of solids yields a treated waste water effluent of acceptable quality and a removed solids blanket having about the same moisture content as that of the metal salt prior art but without the metal salt, free fatty acids and peroxide compounds heretofore present in such solids. Therefore our process provides a solids blanket which is readily rendered into an animal feed product.

Waste water analysis tests were run to compare the recovery potential of the present method to that of the prior art. The test results set forth below clearly show the improved ability of the present method to recover solids over a selected one of those methods previously used. The prior art method utilized for comparison is that set forth in U.S. Pat. No. 3,128,249 issued to Pye on Apr. 7, 1964. The prior art method and the present method were tested twice using 200 and 400 ppm bentonite. The results of the tests are as follows:

|  |  | Treated Waste Water | | | |
|---|---|---|---|---|---|
|  |  | Prior Art | | Present Method | |
|  | Raw Water | 200 ppm Bentonite | 400 ppm Bentonite | 200 ppm Bentonite | 400 ppm Bentonite |
| TSS(mg/l) | 1008.0 | 290.0 | 190.0 | 94.0 | 55.0 |
| OG (mg/l) | 61.4 | 61.6 | 21.0 | 50.4 | 2.4 |
| BOD(mg/l) | 1583.0 | 638.0 | 473.0 | 383.0 | 377.0 |
| TB (NTU) | 240.0 | 86.0 | 52.0 | 18.0 | 7.1 |

It is therefore clear that the present method facilitates recovery of significantly greater amounts of the total suspended solids than the prior art and accordingly reduces the turbidity of the waste water to levels far below that provided by the prior art using bentonite.

While we have shown our invention in two forms, it will be obvious to those skilled in the art that it is not so limited but is susceptible of various changes and modifications without departing from the spirit thereof.

What we claim is:

1. A method for removing solids from a stream of food processing waste water containing fatty acids and peroxide compounds from a chicken processing plant without the use of a metal salt such that said solids may be subsequently rendered as an animal food stuff, comprising the steps of:

(a) introducing a pH adjusting compound to said stream of waste water to maintain the pH thereof at about 3.5 to 9.0;

(b) creating an activated bentonite slurry by introducing bentonite into a first aqueous stream at ratios of about 1% to 10% by weight wherein said bentonite and stream undergo mixing for a sufficient period to activate said slurry;

(c) introducing said bentonite slurry into said stream of waste water at rates ranging from about 200 to 600 milligrams of bentonite per liter of waste water;

(d) introducing an anionic polymer into a second aqueous stream at ratios of about 0.01% to 5.0% by weight anionic polymer to water;

(e) mixing said second aqueous stream with said stream of waste water, thus initiating flocculation of said bentonite, anionic polymer, and solids;

(f) transferring said stream of waste water to a flotation vessel and forming a float blanket containing flocculate bentonite, anionic polymer, and solids and clarified waste water;

(g) removing said float blanket from said clarified waste water for subsequent rendering into an animal food product; and, (h) discharging said clarified waste water from said vessel.

2. A method as described in claim 1 wherein said bentonite introducing step further comprises maintaining a mixture range from 5.5% to 6.5% by weight bentonite to water.

3. A method as described in claim 1 wherein said anionic polymer introducing step further comprises maintaining a mixture range from 0.01% to 0.5% by weight anionic polymer to water.

4. A method as described in claim 3 wherein said bentonite introducing step further comprises maintaining a mixture range from 5.5% to 6.5% by weight bentonite to water.

* * * * *